United States Patent
Cheng et al.

(10) Patent No.: US 11,165,473 B2
(45) Date of Patent: Nov. 2, 2021

(54) SYSTEM AND METHOD FOR ANALOG BEAMFORMING FOR SINGLE-CONNECTED ANTENNA ARRAY

(71) Applicant: Samsung Electronics Co., Ltd., Gyeonggi-do (KR)

(72) Inventors: Hongbing Cheng, San Diego, CA (US); Hyukjoon Kwon, San Diego, CA (US); Qi Zhan, San Diego, CA (US); Kee-Bong Song, San Diego, CA (US)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/881,694

(22) Filed: May 22, 2020

(65) Prior Publication Data
US 2020/0287600 A1 Sep. 10, 2020

Related U.S. Application Data

(63) Continuation of application No. 16/256,328, filed on Jan. 24, 2019, now Pat. No. 10,680,684.

(60) Provisional application No. 62/770,492, filed on Nov. 21, 2018.

(51) Int. Cl.
*H04L 23/02* (2006.01)
*H04B 7/0426* (2017.01)
*H04B 7/06* (2006.01)
*H04B 7/0456* (2017.01)

(52) U.S. Cl.
CPC .......... *H04B 7/043* (2013.01); *H04B 7/0456* (2013.01); *H04B 7/0682* (2013.01)

(58) Field of Classification Search
CPC ... H04L 1/0054; H04L 1/005; H04L 27/2647; H04L 5/0007; H04L 1/0618; H04L 7/0626; H04L 7/0617; H04B 7/0417; H04W 72/085

USPC .................. 375/262, 260, 269; 342/368, 377
See application file for complete search history.

(56) References Cited

U.S. PATENT DOCUMENTS

| | | |
|---|---|---|
| 7,898,478 B2 | 3/2011 | Niu et al. |
| 9,331,760 B2 | 5/2016 | El Ayach et al. |
| 9,872,296 B2 | 1/2018 | Raghavan et al. |
| 2013/0120191 A1 | 5/2013 | Zhang |
| 2016/0149726 A1 | 5/2016 | Hombs |
| 2016/0269093 A1 | 9/2016 | Seol |
| 2016/0353294 A1* | 12/2016 | Wang ............... H04B 7/086 |
| 2018/0205443 A1* | 7/2018 | Kumagai ........... H04B 7/0686 |
| 2019/0109629 A1 | 4/2019 | Park |
| 2019/0115963 A1 | 4/2019 | Zhu |

(Continued)

FOREIGN PATENT DOCUMENTS

| | | |
|---|---|---|
| CN | 107911867 | 4/2018 |
| WO | WO 2018004080 | 1/2018 |

OTHER PUBLICATIONS

Ikram, M. et al., A novel very wideband integrated antenna system for 4G and 5G mm-wave applications, Microw Opt Technol Lett. 2017;59:3082-3088 . . . https://doi.org/10.1002/mop.30879.

*Primary Examiner* — Khai Tran
(74) *Attorney, Agent, or Firm* — The Farrell Law Firm, P.C.

(57) ABSTRACT

A method and system analog beamforming for a single-connected antenna array is herein disclosed. A method includes estimating analog channels on a per-antenna basis, calculating explicitly an analog beamforming matrix based on the estimated analog channels, and performing analog beamforming based on the calculated analog beamforming matrix.

20 Claims, 3 Drawing Sheets

(56) References Cited

U.S. PATENT DOCUMENTS

2019/0115996 A1 4/2019 Wu
2019/0208527 A1 7/2019 Zhang

* cited by examiner

SYSTEM AND METHOD FOR ANALOG BEAMFORMING FOR SINGLE-CONNECTED ANTENNA ARRAY

PRIORITY

This application is a Continuation of U.S. patent application Ser. No. 16/256,328, filed on Jan. 24, 2019, which is based on and claims priority under 35 U.S.C. § 119(e) to a U.S. Provisional Patent Application filed on Nov. 21, 2018 in the United States Patent and Trademark Office and assigned Ser. No. 62/770,492, the entire contents of which are incorporated herein by reference.

FIELD

The present disclosure relates generally to communication systems. In particular, the present disclosure relates to a method and system for analog beamforming for a single-connected antenna array.

BACKGROUND

In a millimeter wave area, single-connection antenna arrays are of interest, meaning that each antenna is only equipped with one phase shifter and analog antennas are separated into several groups, each group is combined independently into separated RF chains, instead of full-connection antenna arrays, that each RF chain has full access to all analog antennas and each analog antenna are connected with multiple phase shifters.

A typical implementation for analog beamforming uses an exhaustive search method to select a beamforming vector from a given codebook. Such a search method, however, does not guarantee optimality.

SUMMARY

According to one embodiment, a method for analog beamforming for a single-connected antenna array includes estimating analog channels on a per-antenna basis, calculating explicitly an analog beamforming matrix based on the estimated analog channels, and performing analog beamforming based on the calculated analog beamforming matrix.

According to one embodiment, a system for analog beamforming for a single-connected antenna array includes a transceiver and a processor configured to estimate analog channels on a per-antenna basis, calculate explicitly an analog beamforming matrix based on the estimated analog channels, and perform analog beamforming based on the calculated analog beamforming matrix.

According to one embodiment, a method for analog beamforming for a single-connected antenna array includes calculating explicitly an analog beamforming matrix, estimating analog channels based on virtual antenna, and performing analog beamforming based on the calculated analog beamforming matrix and the estimated channels on virtual antennas.

According to one embodiment, a system for analog beamforming for a single-connected antenna array includes a transceiver and a processor configured to calculate explicitly an analog beamforming matrix, estimate analog channels based on virtual antenna, and perform analog beamforming based on the calculated analog beamforming matrix and the estimated channels on virtual antennas.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
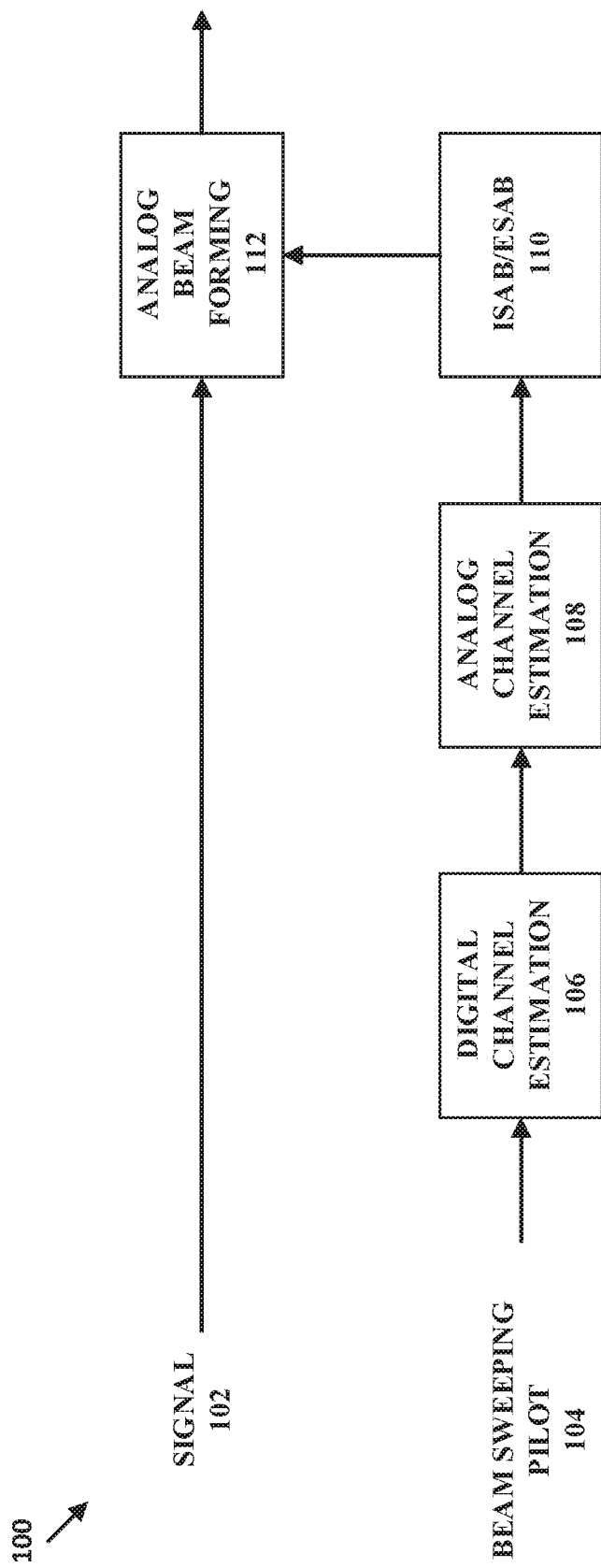
FIG. 1 is a diagram of a channel recovery process, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The systems and methods disclosed herein are targeted at improving analog beamforming by using an explicitly calculated beamforming vector based on a single connected antenna array. Channel information on analog antennas are required for explicit calculation. Disclosed herein are multiple channel recovery methods to estimate the channel information on analog antennas.

Referring to the system model in Equation (1):

$$y = W^H H x + W^H n \quad (1)$$

where y is the received signal, W is the beamforming matrix, and n is the noise. The transmitter analog beamforming and precoder matrices are absorbed in an effective channel matrix, H. The dimensions for each parameter are specified with the variables below:

W: $N_{RX} \times N_{RF}$;
H: $N_{RX} \times N_s$;
y: $N_{RF} \times 1$;
x: $N_s \times 1$;
n: $N_{RF} \times 1$; with
$N_s$: the number of streams (e.g., 2);
$N_{RF}$: the number of RF chains (e.g., 2);

$N_{RX,RF}$: the number of received analog antennas per RF chain (e.g., 4); and
$N_{RX} = N_{RX,RF} * N_{RF}$: the number of total received analog antennas (e.g., 8).

In particular, the receiver analog beamforming matrix, W, is the main design parameter to derive. The following calculations were made in the case where there are 2 Rx panels, each panel has 4 antennas such that $N_{RF}=2$ and $N_{RX,RF}=4$. To accommodate the practical RF constraints, W is a form of block diagonal matrix, having two column beamforming matrix vectors, $w_1$ and $w_2$, each of which has the dimension $N_{RX,RF} \times 1$ and corresponds to the first and second RF chain. W may be written as in Equation (2):

$$W = \begin{bmatrix} w_1 & 0 \\ 0 & w_2 \end{bmatrix} \quad (2)$$

To overcome the channel covariance matrix $$R = HH^H = \begin{bmatrix} R_a & R_b \\ R_c & R_d \end{bmatrix},$$

Equations (3) and (4) are used as follows:

$$(\hat{w}_1, \hat{w}_2) = \arg\max \log g(w_1, w_2) \quad (3)$$

$$g(w_1, w_2) = \left| \sigma^2 I + \begin{bmatrix} w_1 & 0 \\ 0 & w_2 \end{bmatrix}^H \begin{bmatrix} R_a & R_b \\ R_c & R_d \end{bmatrix} \begin{bmatrix} w_1 & 0 \\ 0 & w_2 \end{bmatrix} \right| \quad (4)$$

with Equation (4) being the indication function.

The beamforming matrix W and/or beamforming vectors $w_1$, $w_2$ can be explicitly calculated via an iterative single-connection analog beamforming (ISAB) process, where phase shifter coefficients are obtained sequentially (e.g., take an initial value for $w_1$, then use $w_1$ to calculate $w_2$, and with the new $w_2$, calculate a new $w_1$, calculate a new $w_2$ with the new $w_1$, and so forth), or via an eigen-based single-connection analog beamforming (ESAB) process.

The closed form solution for the single-connection beamforming problem is derived with a few approximations in the ESAB process. Channel information on analog antennas are used for the explicit calculation analog beamforming method (both ISAB and ESAB) of the present disclosure. However, the available receiver (Rx) side channel information is the estimated channel on each RF chain based on channel state information reference signal (CSI-RS) beam-sweeping periods.

Regarding the ISAB process, the ISAB process is derived assuming a narrow-band channel (or single subcarrier case). Given an initial value of $w_2$, the problem is formulated to Equation (5):

$$\max \log(g(w_1|w_2)) \quad (5)$$

such that, in Equation (6):

$$\hat{w}_1(w_2) = \arg\max w_1^H D_1 w_1 \quad (6)$$

$$= Q_1(:, 1)$$

where, in Equation (7):

$$D_1 = R_a(w_2^H R_d w_2 + \sigma^2) - R_b w_2 w_2^H R_b^H = Q_1 \Lambda_1 Q_1^H \quad (7)$$

Updating with given $w_1$ is similar, as in Equation (8):

$$\hat{w}_2(\hat{w}_1) = \arg\max w_2^H D_2 w_2 \qquad (8)$$
$$= \arg\max w_2^H Q_2 \Lambda_2 Q_2^H w_2$$
$$= Q_2(:,1)$$

with Equation (9):

$$D_2 = R_d(\hat{w}_1^H R_a \hat{w}_1 + \sigma^2) - R_c \hat{w}_1 \hat{w}_1^H R_c^H = Q_2 \Lambda_2 Q_2^H \qquad (9)$$

Multiple CSI-RS resource elements (REs) exist over the whole bandwidth part. When applying the ISAB method, the D1 and D2 matrix is computed for each subcarrier and then they are averaged across subcarriers. $D_{i,n}$ represents the $D_i$ matrix calculated on the nth subcarrier, as in Equation (10):

$$D_i = \frac{1}{N} \sum_n D_{i,n} \qquad (10)$$

However, the above-described solutions may not consider the constraint of amplitude in analog beamforming. To satisfy this constraint, the phase information is taken as Equation (11) and Equation (12):

$$w_2 = e^{j \angle w_2} \qquad (11)$$
$$w_1 = e^{j \angle w_1} \qquad (12)$$

Regarding the ESAB process, the ESAB process is, in general, a suboptimum solution, and is a closed form solution for the initial optimization problem in Equation (3) with the following three assumptions:

(1) The signal-to-noise ratio (SNR) is high enough so that noise is ignored (i.e., $\sigma^2 \approx 0$);

(2) The amplitude constraint in the design of analog beamforming is ignored at the derivation procedure (i.e., $w^*_1 D_1 w_1 \approx \lambda_{max}$) under the assumption its effects are minor; and (3) Two streams are transmitted over multiple antennas.

Similar to ISAB, ESAB is also derived assuming a narrow-band channel (e.g., a single subcarrier case). The channel matrix is defined as $$H = \begin{bmatrix} h_{11} & h_{12} \\ h_{21} & h_{22} \end{bmatrix}$$

and $K = h^*_{22} h_{11}{}^H - h^*_{21} h_{12}{}^H$, such that, as in Equation (13):

$$\tilde{D}_2 = \begin{bmatrix} h^*_{22} & h^*_{21} \end{bmatrix} \begin{bmatrix} h_{11}^H \\ -h_{12}^H \end{bmatrix} \begin{bmatrix} h_{11} & -h_{12} \end{bmatrix} \begin{bmatrix} h_{22}^T \\ h_{21}^T \end{bmatrix} = KK^H = \tilde{Q}_2 \tilde{\Lambda}_2 \tilde{Q}_2^H \qquad (13)$$

Using the high SNR approximation and ignoring noise, the optimal solution is $w_2 = \tilde{Q}_2^H(:,1)$ and $w_1 = \tilde{Q}_1(:,1)$ with Equation (14):

$$\tilde{D}_1 K^H w^*_2 w_2^T K = \tilde{Q}_1 \tilde{\Lambda}_1 \tilde{Q}_1^H \qquad (14)$$

For the single subcarrier case, $$w_1 = \frac{1}{\beta} K^H w^*_2,$$

where $\beta$ is the normalization factor. For multi subcarrier cases, $\tilde{D}_{i,n}$ is defined as the $\tilde{D}_i$ matrix calculated on the nth subcarrier, such that in Equation (15):

$$\tilde{D}_i = \frac{1}{N} \sum_n \tilde{D}_{i,n} \qquad (15)$$

Similar to ISAB, to satisfy the constraint of analog beamforming, the phase information of $w_2$ and $w_1$ can be taken.

In the present ISAB/ESAB processes, the channel matrix per each analog antenna is assumed to be known. In reality, directly estimating the channel per analog antenna may not be possible. Instead, the beamformed channel in each CSI-RS symbol can be estimated during beam sweeping.

In addition to the ISAB/ESAB processes above, multiple processes for recovering analog channels are provided herein.

FIG. 1 is a diagram 100 of a channel recovery process, according to an embodiment. The channel recovery process 100 involves an analog beamforming procedure based on per-antenna channel estimation (CE). The process utilizes the signal 102 and a beam sweeping pilot signal 104. At 106, the process performs the digital channel estimation on the pilot 104. At 108, the process performs the analog channel estimation.

Assuming the channel vector between the $i^{th}$ Rx panel and the $j^{th}$ Tx panel on subcarrier k does not change during the Rx beam sweeping duration, on the $l^{th}$ sweeping symbol, beam forming vector $a_l$ is applied on the $i^{th}$ Rx panel. l=1, . . . , N where N is the total number of beam sweeping symbols, as in Equation (16):

$$r_{i,j,k,l} = a_l^H h_{i,j,k} \qquad (16)$$

By defining $r_{i,j,k} = [r_{i,j,k,1}, r_{i,j,k,2}, \ldots, r_{i,j,k,N}]^T$ and $A = [a_1, a_2, \ldots, a_N]^H$, Equation (17) is presented as:

$$r_{i,j,k} = A h_{i,j,k} \qquad (17)$$

The analog channel estimation 108 is an under deterministic problem, especially when the beam-sweeping duration is not long enough to recover all the channel information per panel and has many solutions, such as least square estimation and compress sensing. Regularized least square (RLS) channel recovery may be utilized in the analog channel estimation 108.

Assuming noise is completely eliminated via de-noising, the channel vector for the $i^{th}$ Rx panel and the $j^{th}$ Tx panel on subcarrier k can be recovered from a least square method as in Equation (18):

$$h_{i,j,k} = A^H (AA^H)^{-1} r_{i,j,k} \qquad (18)$$

The dimension of $r_{i,j,k}$ is N×1, A is N×$N_{RX,RF}$, $h_{i,j,k}$ is $N_{RX,RF}$×1. In practical applications, it is likely that N≤$N_{RX,RF}$, which causes an ill-condition on the least square. Instead, the regularized least square imposes another constraint that the channel power does not diverge, as in Equation (19):

$$L(h_{i,j},\lambda) = \|r_{i,j,k} - A h_{i,j,k}\|^2 + \lambda \|h_{i,j,k}\|^2 \qquad (19)$$

Equation (19) is converted to an original least square problem, as in Equation (20):

$$L(h_{i,j,k}, \lambda) = \left\| \begin{bmatrix} r_{i,j,k} \\ 0 \end{bmatrix} - \begin{bmatrix} A \\ \sqrt{\lambda} \end{bmatrix} h_{i,j,k} \right\|^2 \qquad (20)$$

Thus, the RLS solution may be provided as Equation (21):

$$h_{i,j,k} = A^H(AA^H + \lambda I_N)^{-1} r_{i,j,k} \quad (21)$$

Then, at 110, the process performs the ISAB or ESAB as described above, and at 112, the process performs analog beamforming.

Figure 2:
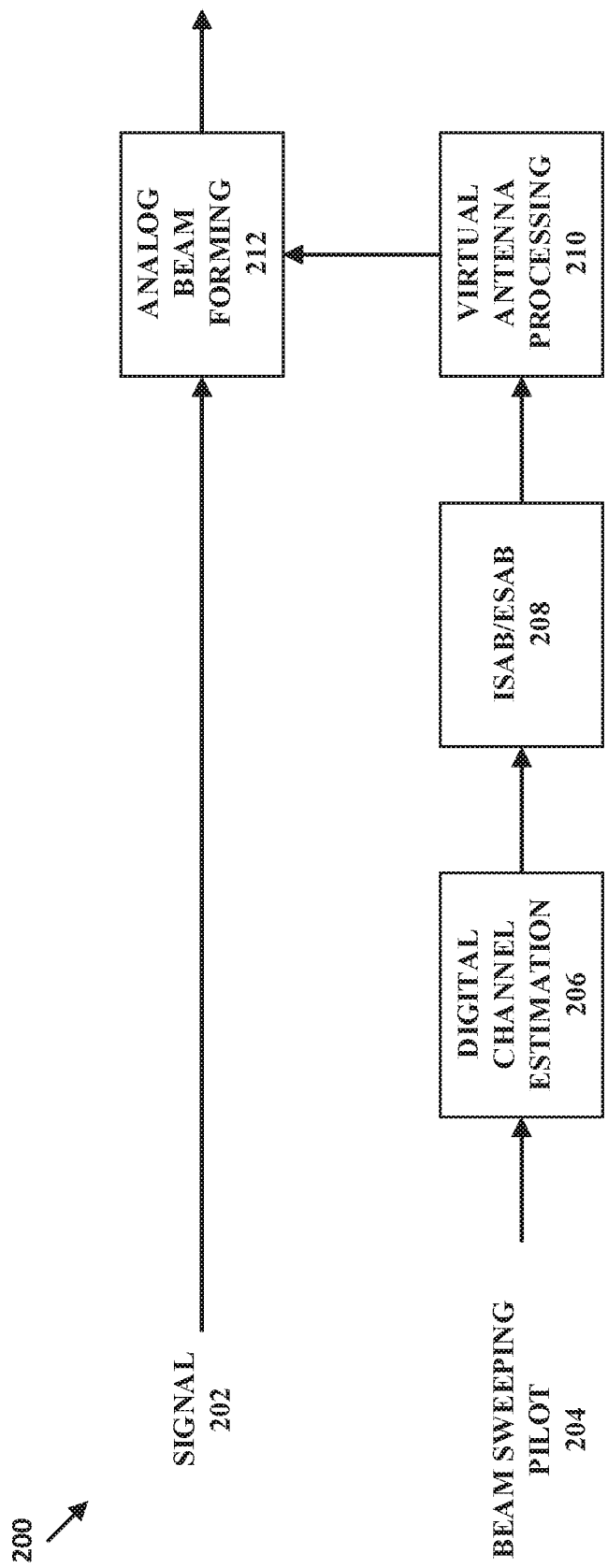
FIG. 2 is a diagram of a channel recovery process, according to an embodiment.

FIG. 2 is a diagram of a channel recovery process 200, according to an embodiment. The channel recovery process 200 is an analog beamforming procedure without per-antenna CE, such that the explicit calculation analog beamforming process (ISAB/ESAB) are performed first on the estimated channel on each RF chain, and then a post processing function is applied to the beamforming vectors from the ISAB/ESAB.

The process 200 utilizes a signal 202 and a beam sweeping pilot signal 204. At 206, the process 200 performs digital channel estimation on the pilot 204, and then performs the ISAB or ESAB as described above at 208.

At 210, processing on a virtual antenna occurs. This is another alternative solution to recover a channel vector, $h_{i,j,k}$, from a noise model of Equation (22):

$$r_{i,j,k} = A(h_{i,j,k} + \delta_k) \quad (22)$$

This process does not technically recover a channel vector $h_{i,j,k}$, but instead takes into account $Ah_{i,j,k}$ as a virtual channel. As a result, the received signal is re-written as Equation (23):

$$r_{i,j,k} = \tilde{h}_{i,j,k} + A\delta_k \quad (23)$$

Additionally, the noise can be pre-whitened, such as in Equation (24):

$$\tilde{r}_{i,j,k} = R_C^{-\frac{1}{2}} r_{i,j,k}$$
$$= R_C^{-1/2} \tilde{h}_{i,j,k} + \ddot{\delta}_k \quad (24)$$

where, as in Equation (25):

$$R_C = \sigma^2 A A^H \quad (25)$$

Now, $R_C^{-1/2} \tilde{h}_{i,j,k}$ serves as an effective channel and is used to generate the average covariance of channels over all subcarriers.

It is assumed that the resulting solution from ISAB or ESAB would be $W_B$, as in Equation (26):

$$W_B = f_{ABF}(\tilde{r}_{i,j,k}, A) \quad (26)$$

where $f_{ABF}(\bullet)$ is the analog beamforming function such as ISAB or ESAB. $W_B$ is not restricted by the amplitude constraint. It is generated from $f_{ABF}(\bullet)$ without eliminating the amplitude information. As a result, the amplitude of each element in $W_B$ is not necessarily 1.

Thereafter, the virtual channel is used to derive the beam coefficient vector as Equation (27):

$$W_B = f_{ABF}(\tilde{r}_{i,j,k}, A) \quad (27)$$

The channel covariance matrix may be averaged in a frequency domain over all subcarriers, and then $D_i$ in Equation (10) is calculated once.

Figure 3:
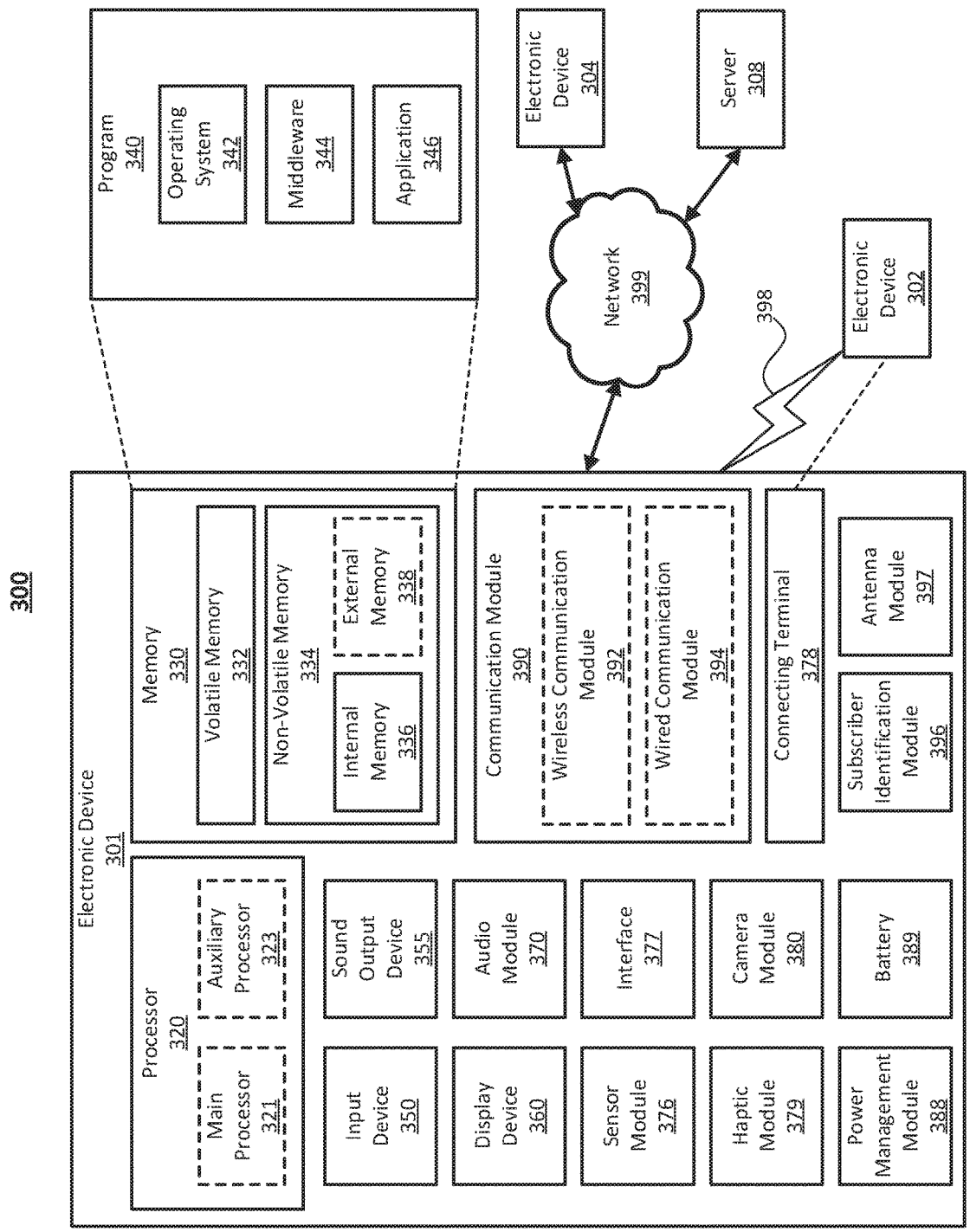
FIG. 3 is a block diagram of an electronic device in a network environment, according to one embodiment.

FIG. 3 is a block diagram of an electronic device 301 in a network environment 300, according to one embodiment. Referring to FIG. 3, the electronic device 301 in the network environment 300 may communicate with an electronic device 302 via a first network 398 (e.g., a short-range wireless communication network), or an electronic device 304 or a server 308 via a second network 399 (e.g., a long-range wireless communication network). The electronic device 301 may communicate with the electronic device 304 via the server 308. The electronic device 301 may include a processor 320, a memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, or an antenna module 397. In one embodiment, at least one (e.g., the display device 360 or the camera module 380) of the components may be omitted from the electronic device 301, or one or more other components may be added to the electronic device 301. In one embodiment, some of the components may be implemented as a single integrated circuit (IC). For example, the sensor module 376 (e.g., a fingerprint sensor, an iris sensor, or an illuminance sensor) may be embedded in the display device 360 (e.g., a display).

The processor 320 may execute, for example, software (e.g., a program 340) to control at least one other component (e.g., a hardware or a software component) of the electronic device 301 coupled with the processor 320, and may perform various data processing or computations. As at least part of the data processing or computations, the processor 320 may load a command or data received from another component (e.g., the sensor module 376 or the communication module 390) in volatile memory 332, process the command or the data stored in the volatile memory 332, and store resulting data in non-volatile memory 334. The processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or execute a particular function. The auxiliary processor 323 may be implemented as being separate from, or a part of, the main processor 321.

The auxiliary processor 323 may control at least some of the functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to one embodiment, the auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thererto. The memory 330 may include the volatile memory 332 or the non-volatile memory 334.

The program 340 may be stored in the memory 330 as software, and may include, for example, an operating system (OS) 342, middleware 344, or an application 346.

The input device 350 may receive a command or data to be used by other component (e.g., the processor 320) of the electronic device 301, from the outside (e.g., a user) of the electronic device 301. The input device 350 may include, for example, a microphone, a mouse, or a keyboard.

The sound output device 355 may output sound signals to the outside of the electronic device 301. The sound output device 355 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 360 may visually provide information to the outside (e.g., a user) of the electronic device 301. The display device 360 may include, for example, a display, a hologram device, or a projector and control circuitry to control a corresponding one of the display, hologram device, and projector. According to one embodiment, the display device 360 may include touch circuitry adapted to detect a touch, or sensor circuitry (e.g., a pressure sensor) adapted to measure the intensity of force incurred by the touch.

The audio module 370 may convert a sound into an electrical signal and vice versa. According to one embodiment, the audio module 370 may obtain the sound via the input device 350, or output the sound via the sound output device 355 or a headphone of an external electronic device 302 directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. The sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device 302 directly (e.g., wiredly) or wirelessly. According to one embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device 302. According to one embodiment, the connecting terminal 378 may include, for example, an HDMI connector, a USB connector, an SD card connector, or an audio connector (e.g., a headphone connector).

The haptic module 379 may convert an electrical signal into a mechanical stimulus (e.g., a vibration or a movement) or an electrical stimulus which may be recognized by a user via tactile sensation or kinesthetic sensation. According to one embodiment, the haptic module 379 may include, for example, a motor, a piezoelectric element, or an electrical stimulator.

The camera module 380 may capture a still image or moving images. According to one embodiment, the camera module 380 may include one or more lenses, image sensors, image signal processors, or flashes.

The power management module 388 may manage power supplied to the electronic device 301. The power management module 388 may be implemented as at least part of, for example, a power management integrated circuit (PMIC).

The battery 389 may supply power to at least one component of the electronic device 301. According to one embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the AP) and supports a direct (e.g., wired) communication or a wireless communication. According to one embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or a standard of the Infrared Data Association (IrDA)) or the second network 399 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The antenna module 397 may transmit or receive a signal or power to or from the outside (e.g., the external electronic device) of the electronic device 301. According to one embodiment, the antenna module 397 may include one or more antennas, and, therefrom, at least one antenna appropriate for a communication scheme used in the communication network, such as the first network 398 or the second network 399, may be selected, for example, by the communication module 390 (e.g., the wireless communication module 392). The signal or the power may then be transmitted or received between the communication module 390 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 301 and the external electronic device 304 via the server 308 coupled with the second network 399. Each of the electronic devices 302 and 304 may be a device of a same type as, or a different type, from the electronic device 301. All or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, or client-server computing technology may be used, for example.

One embodiment may be implemented as software (e.g., the program 340) including one or more instructions that are stored in a storage medium (e.g., internal memory 336 or external memory 338) that is readable by a machine (e.g., the electronic device 301). For example, a processor of the electronic device 301 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for analog beamforming for a single-connected antenna array, comprising:
   estimating analog channels on a per-antenna basis;
   calculating explicitly an analog diagonal beamforming matrix based on the estimated analog channels; and
   performing analog beamforming based on the calculated analog diagonal beamforming matrix.

2. The method of claim 1, wherein the analog diagonal beamforming matrix is calculated according to an iterative single-connection analog beamforming (ISAB) process.

3. The method of claim 2, wherein the ISAB process comprises obtaining phase shifter coefficients sequentially.

4. The method of claim 1, wherein the analog diagonal beamforming matrix is calculated according to an eigen-based single-connection analog beamforming (ESAB) process.

5. The method of claim 1, wherein estimating analog channels further comprises recovering analog channel information by a regularized least square (RLS) channel recovery.

6. A system for analog beamforming for a single-connected antenna array, comprising:
   a transceiver; and
   a processor configured to:
   estimate analog channels on a per-antenna basis;
   calculate explicitly an analog diagonal beamforming matrix based on the estimated analog channels; and
   perform analog beamforming based on the calculated analog diagonal beamforming matrix.

7. The system of claim 6, wherein the analog diagonal beamforming matrix is calculated according to an iterative single-connection analog beamforming (ISAB) process.

8. The system of claim 6, wherein the analog diagonal beamforming matrix is calculated according to an eigen-based single-connection analog beamforming (ESAB) process.

9. The system of claim 8, wherein the ESAB process comprises deriving a closed form solution for single-connection optimization.

10. The system of claim 6, wherein the processor is further configured to estimate analog channels by recovering analog channel information by a regularized least square (RLS) channel recovery.

11. A method for analog beamforming for a single-connected antenna array, comprising:
    calculating explicitly an analog diagonal beamforming matrix;
    estimating analog channels based on virtual antenna; and
    performing analog beamforming based on the calculated analog diagonal beamforming matrix and the estimated channels on virtual antennas.

12. The method of claim 11, wherein the analog diagonal beamforming matrix is calculated according to iterative single-connection analog beamforming (ISAB) process.

13. The method of claim 11, wherein the analog diagonal beamforming matrix is calculated according to eigen-based single-connection analog beamforming (ESAB) process.

14. The method of claim 13, wherein the ESAB process comprises deriving a closed form solution for single-connection optimization.

15. The method of claim 11, wherein estimating. analog channels further comprises recovering analog channel information as a virtual channel.

16. A system for analog beamforming for a single-connected antenna array, comprising:
   a transceiver; and
   a processor configured to:
      calculate explicitly an analog diagonal beamforming matrix;
      estimate analog channels based on virtual antenna; and
      perform analog beamforming based on the calculated analog diagonal beamforming matrix and the estimated channels on virtual antennas.

17. The system of claim 16, wherein the analog diagonal beamforming matrix is calculated according to iterative single-connection analog beamforming (ISAB) process.

18. The system of claim 17, wherein the ISAB process comprises obtaining phase shifter coefficients sequentially.

19. The system of claim 16, wherein the analog diagonal beamforming matrix is calculated according to eigen-based single-connection analog beamforming (ESAB) process.

20. The system of claim 16, wherein the processor is further configured to estimate analog channels by recovering analog channel information as virtual channel.

* * * * *